United States Patent
Da Silva Ramos et al.

(10) Patent No.: US 10,198,147 B2
(45) Date of Patent: Feb. 5, 2019

(54) OBJECT MANAGEMENT AND VISUALIZATION USING A COMPUTING DEVICE

(71) Applicant: Samsung Electronics Co., Ltd., Gyeonggi-Do (KR)

(72) Inventors: Heron Da Silva Ramos, San Mateo, CA (US); Tommy Park, San Jose, CA (US); Nasson Julian Schahin Boroumand, Gold River, CA (US); Syyean Gastelum, Santa Clara, CA (US); Wu Guan, San Jose, CA (US); Jinghai Rao, Santa Clara, CA (US); Hyung Keun Kim, Stuttgart (DE); Florian Dusch, Stuttgart (DE)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 310 days.

(21) Appl. No.: 15/073,095

(22) Filed: Mar. 17, 2016

(65) Prior Publication Data
US 2017/0269815 A1  Sep. 21, 2017

(51) Int. Cl.
*G06F 3/0482* (2013.01)
*G06F 3/0481* (2013.01)

(52) U.S. Cl.
CPC ........ *G06F 3/04817* (2013.01); *G06F 3/0482* (2013.01)

(58) Field of Classification Search
CPC ..................................................... G06T 11/60
See application file for complete search history.

(56) References Cited

U.S. PATENT DOCUMENTS

| | | | |
|---|---|---|---|
| 8,078,603 B1 * | 12/2011 | Chandratillake ... | G06F 17/3084 707/706 |
| 8,863,025 B2 | 10/2014 | McDonald et al. | |
| 9,098,185 B2 | 8/2015 | Kai et al. | |
| 9,152,292 B2 | 10/2015 | Xiao et al. | |

(Continued)

FOREIGN PATENT DOCUMENTS

EP   2753065 A2   7/2014

OTHER PUBLICATIONS

WIPO Int'l. Appln. No. PCT/KR2017/002643, International Search Report, dated May 23, 2017, 3 pg.

(Continued)

*Primary Examiner* — Justin S Lee
(74) *Attorney, Agent, or Firm* — Cuenot, Forsythe & Kim, LLC

(57) ABSTRACT

Presenting thumbnails of visual objects using a data processing system includes determining, using a processor, aspect ratios for a plurality of visual objects and associating, using the processor, each of the plurality of visual objects with a thumbnail size selected from a plurality of predetermined thumbnail sizes based upon the aspect ratio of the visual object. A determination is made whether a visual feature is detected within the plurality of visual objects. A layout for displaying thumbnails of the plurality of visual objects is generated using the processor based on chronological order of the visual objects, detection of the visible feature, and the thumbnail sizes associated with the visual objects. Using a screen and the processor, the thumbnails are displayed according to the layout.

25 Claims, 10 Drawing Sheets

(56) References Cited

U.S. PATENT DOCUMENTS

| | | | |
|---|---|---|---|
| 2006/0200758 A1* | 9/2006 | Atkins | G06T 11/60 715/209 |
| 2006/0259857 A1* | 11/2006 | Atkins | G06T 11/60 715/235 |
| 2007/0209025 A1 | 9/2007 | Jing et al. | |
| 2007/0253028 A1* | 11/2007 | Widdowson | G06T 11/60 358/1.18 |
| 2009/0067753 A1* | 3/2009 | Hanechak | G06T 11/60 382/298 |
| 2009/0089660 A1 | 4/2009 | Atkins et al. | |
| 2009/0110300 A1* | 4/2009 | Kihara | G06F 17/30274 382/224 |
| 2009/0210215 A1* | 8/2009 | Konno | G06F 17/217 704/3 |
| 2010/0142833 A1* | 6/2010 | Ishizawa | G06F 3/0482 382/224 |
| 2010/0182501 A1* | 7/2010 | Sato | G06T 11/60 348/441 |
| 2010/0199227 A1* | 8/2010 | Xiao | G06F 3/0481 715/863 |
| 2011/0074824 A1 | 3/2011 | Srinivasan et al. | |
| 2011/0090353 A1* | 4/2011 | Hirata | H04N 5/23219 348/220.1 |
| 2011/0096075 A1* | 4/2011 | Borders | G06T 11/60 345/441 |
| 2012/0054649 A1 | 3/2012 | McDonald et al. | |
| 2012/0206498 A1 | 8/2012 | Kai et al. | |
| 2012/0306929 A1* | 12/2012 | Chalkov | G06F 3/0488 345/666 |
| 2013/0091470 A1* | 4/2013 | Sciammarella | G06F 3/0481 715/838 |
| 2013/0106913 A1 | 5/2013 | Edmiston et al. | |
| 2013/0311940 A1 | 11/2013 | Ragusa | |
| 2014/0099034 A1 | 4/2014 | Rafati et al. | |
| 2014/0104477 A1* | 4/2014 | Choi | G11B 27/28 348/333.05 |
| 2014/0149926 A1* | 5/2014 | Min | G06F 3/0481 715/788 |
| 2014/0188843 A1 | 7/2014 | Smiling | |
| 2014/0189502 A1 | 7/2014 | Enns et al. | |
| 2014/0280054 A1* | 9/2014 | Karunakaran | G06F 17/30991 707/722 |
| 2015/0002527 A1* | 1/2015 | Chedeau | G06T 11/60 345/581 |
| 2015/0177966 A1 | 6/2015 | Ragusa | |
| 2016/0063672 A1* | 3/2016 | Chiang | G06T 3/40 345/428 |
| 2016/0104052 A1* | 4/2016 | Kim | G06K 9/2081 382/176 |

OTHER PUBLICATIONS

WIPO Int'l. Appln. No. PCT/KR2017/002643, Written Opinion, dated May 23, 2017, 7 pg.

* cited by examiner

OBJECT MANAGEMENT AND VISUALIZATION USING A COMPUTING DEVICE

TECHNICAL FIELD

This disclosure relates to object management and visualization using a computing device.

BACKGROUND

Many computing devices such as desktop computers, portable computers, smart phones, tablet computers, and other information appliances display images using a gallery view. A gallery view displays thumbnails for multiple images on the screen of the computing device concurrently. Typically, all of the thumbnails in the gallery view are uniform, or same, in size thereby allowing the thumbnails to be displayed in a rectangular or square grid. This uniformity, however, is not visually appealing to users and does not provide users with a rich viewing experience.

SUMMARY

One embodiment includes a method of presenting thumbnails of visual objects. The method includes determining, using a processor, aspect ratios for a plurality of visual objects, associating, using the processor, each of the plurality of visual objects with a thumbnail size selected from a plurality of predetermined thumbnail sizes based upon the aspect ratio of the visual object, and determining, using the processor, whether a visual feature is detected within the plurality of visual objects. The method includes generating, using the processor, a layout for displaying thumbnails of the plurality of visual objects based on chronological order of the visual objects, detection of the visual feature, and the thumbnail sizes associated with the visual objects. The method further includes displaying, using a screen and the processor, the thumbnails according to the layout.

Another embodiment includes an apparatus for presenting thumbnails of visual objects. The apparatus includes a screen and a processor coupled to the screen. The processor is configured to determine aspect ratios for a plurality of visual objects, associate each of the plurality of visual objects with a thumbnail size selected from a plurality of predetermined thumbnail sizes based upon the aspect ratio of the visual object, and determine whether a visual feature is detected within the plurality of visual objects. The processor is configured to generate a layout for displaying thumbnails of the plurality of visual objects based on chronological order of the visual objects, detection of the visual feature, and the thumbnail sizes associated with the visual objects. The processor is also configured to display, using the screen, the thumbnails according to the layout.

Another embodiment includes a computer program product. The computer program product includes a computer readable storage medium having program code stored thereon for presenting thumbnails of visual objects. The program code is executable by a processor to perform operations. The operations include, determining, using the processor, aspect ratios for a plurality of visual objects, associating, using the processor, each of the plurality of visual objects with a thumbnail size selected from a plurality of predetermined thumbnail sizes based upon the aspect ratio of the visual object, and determining, using the processor, whether a visual feature is detected within the plurality of visual objects. The operations include generating, using the processor, a layout for displaying thumbnails of the plurality of visual objects based on chronological order of the visual objects, detection of the visual feature, and the thumbnail sizes associated with the visual objects. The operations also include displaying, using a screen and the processor, the thumbnails according to the layout.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 17-1, 17-2, and 17-3, taken collectively, are flow charts illustrating an exemplary method of generating a layout for displaying thumbnails for visual objects.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to managing and displaying visual objects using a computing device. In accordance with the inventive arrangements described herein, visual objects are analyzed to determine one or more attributes. Aspect ratio and timestamp are examples of attributes of the visual objects that may be determined. Using these attribute(s), the visual objects may be associated with one or more different, predetermined thumbnail sizes. The thumbnail sizes associated with the visual objects may be used, in combination with chronological ordering, to determine a layout for displaying thumbnails of the visual objects. The computing device may display the visual objects in accordance with the layout.

In one aspect, the content of the visual objects may be analyzed to determine additional attributes of the visual objects. For example, one or more visual features may be detected within the visual objects. The detected visual features may be used to perform additional operations such as selecting a particular thumbnail size to be used for a visual object in the layout. The detected visual features may also be used to determining the region of the visual object that is shown in the thumbnail used in the layout, e.g., where or how to crop the thumbnail. In another aspect, metadata for the digital objects may be analyzed to determine further attributes. The attributes obtained from analysis of metadata of the visual objects may be used in selecting a particular thumbnail size for the visual objects as displayed in the layout. Further details are described below with reference to the drawings.

Figure 1:
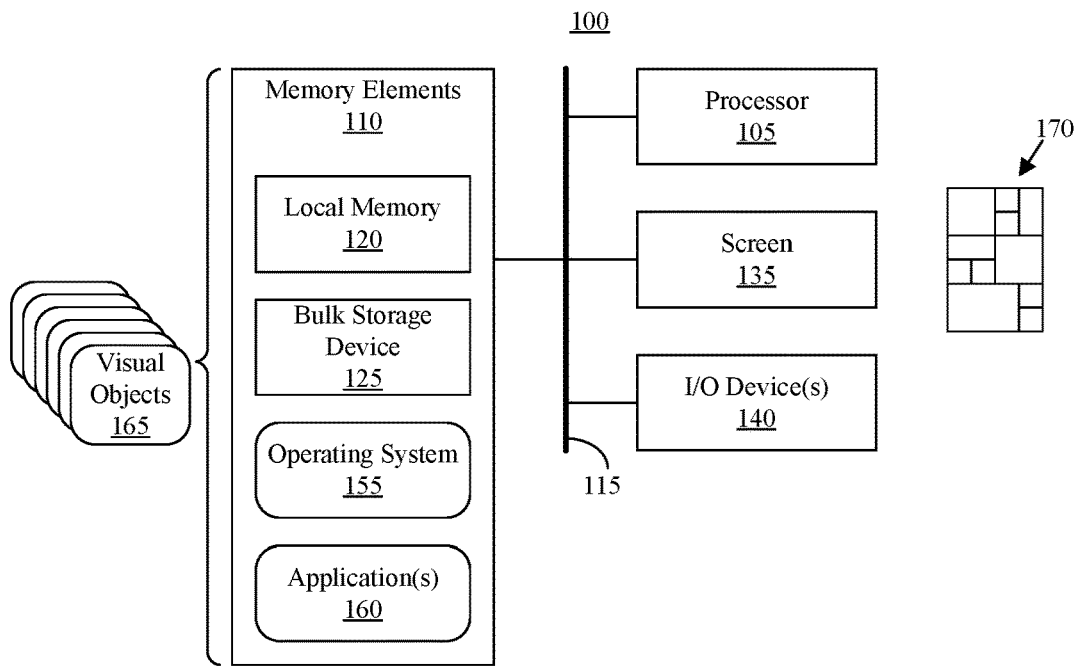
FIG. 1 is a block diagram of an exemplary data processing system.

FIG. 1 is a block diagram of an exemplary data processing system (system) 100. System 100 may be used to implement any of a variety of systems and/or computing devices that include a processor and memory and that are capable of performing the operations described within this disclosure.

As pictured, system 100 includes at least one processor 105 coupled to memory elements 110 through a system bus 115 or other suitable circuitry such as an input/output (I/O) subsystem. System 100 stores program code within memory elements 110. Processor 105 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

System 100 may be coupled to one or more I/O devices such as a screen 135 and one or more additional I/O device(s) 140. The I/O devices described herein may be coupled to system 100 either directly or through intervening I/O controllers. In one aspect, screen 135 may be implemented as a display device that is not touch sensitive. In another aspect, screen 135 may be implemented as a display device that is touch sensitive.

Examples of I/O device(s) 140 may include, but are not limited to, a keyboard, a pointing device, a camera, a speaker, and a microphone. In some cases, one or more of the I/O device(s) may be combined as in the case where a touch sensitive display device (e.g., a touchscreen) is used as screen 135. In that case, screen 135 may also implement a keyboard and a pointing device. Other examples of I/O devices 140 may include sensors. Exemplary sensors may include, but are not limited to, an accelerometer, a light sensor, touch screen sensors, one or more biometric sensors, a gyroscope, a compass, or the like.

I/O devices 140 may also include one or more network adapter(s). A network adapter is a communication circuit configured to establish wired and/or wireless communication links with other devices. The communication links may be established over a network or as peer-to-peer communication links. Accordingly, network adapters enable system 100 to become coupled to other systems, computer systems, remote printers, and/or remote storage devices. Exemplary network adapter(s) may include, but are not limited to, modems, cable modems, Ethernet cards, wireless transceivers, whether short and/or long range wireless transceivers (e.g., cellular transceivers, 802.11x (Wi-Fi™) compatible transceivers, Bluetooth® compatible transceivers, and the like).

As pictured in FIG. 1, memory elements 110 may store an operating system 155 and one or more application(s) 160. In one aspect, operating system 155 and application(s) 160, being implemented in the form of executable program code, are executed by system 100 and, more particularly, by processor 105. As such, operating system 155 and application(s) 160 may be considered an integrated part of system 100. Operating system 155, application(s) 160, and any data items used, generated, and/or operated upon by system 100 are functional data structures that impart functionality when employed as part of system 100.

As pictured, system 100 stores a plurality of visual objects 165 in memory elements 110. As defined within this disclosure, the term "visual object" is a digital or computer readable file specifying digital information that, when rendered by a processor to a screen, generates a picture. In one aspect, a visual object is an image. In another aspect, a visual object is a video. In still another aspect, a visual object is a document such as a word processing document, a spreadsheet, a presentation, a Web page, or the like.

System 100 is configured to display thumbnails of visual objects 165 in a mosaic view 170 using screen 135. A "mosaic view," as defined within this disclosure, means a view of a plurality of thumbnails of visual objects where the thumbnails have non-uniform, rectangular sizes. As defined herein, the term "thumbnail" means an image that is a smaller representation of a larger visual object. For example, referring to an image type visual object, a thumbnail is a smaller image representation of a larger image. Thumbnails are used to facilitate ease of management and viewing of a group of larger visual objects. The term "motion thumbnail," as defined herein, means a visual object that includes a plurality of thumbnails played in a sequential order to simulate motion, multimedia, video, or represent a plurality of visual objects. A motion thumbnail may be generated from a plurality of visual objects and sequentially displays the different ones of the plurality of thumbnails included therein. For example, a motion thumbnail may display a series of thumbnails obtained from a video thereby implementing a smaller representation of the video or a portion of the video. A motion thumbnail may display a series of thumbnails obtained from a plurality of individual images taken in a burst mode, or the like. Thus, one or more of the thumbnails of mosaic view 170 may be motion thumbnails.

In one aspect, system 100 may be used to implement a computer such as a personal computer, a server, or the like. In another aspect, system 100 may be used to implement a mobile computing device. Examples of mobile computing devices may include, but are not limited to, "smart" phone, a tablet computer, a mobile media device, and a game console, a mobile internet device (MID), a personal digital assistant, a laptop computer, a mobile appliance device, or the like.

System 100 may include fewer components than shown or additional components not illustrated in FIG. 1 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

Figure 2:
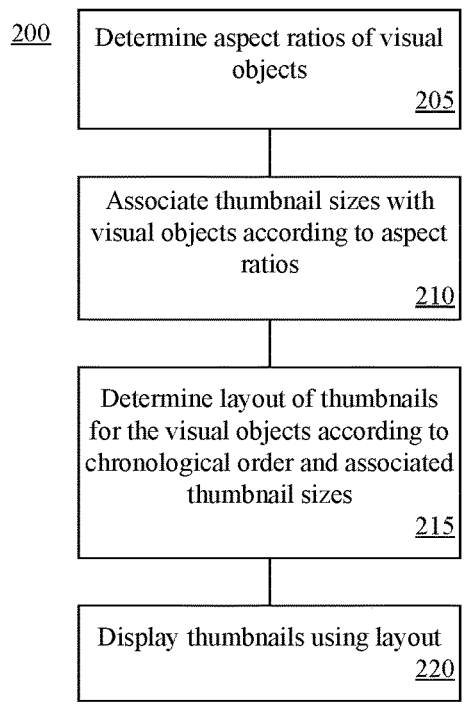
FIG. 2 is a flow chart illustrating an exemplary method of presenting thumbnails of visual objects.

FIG. 2 is a flow chart illustrating an exemplary method 200 of presenting thumbnails of visual objects. Method 200 may be implemented by a system as described with reference to FIG. 1. Method 200 may begin in a state where a plurality of visual objects are stored within the system and are to be displayed using a mosaic view. For example, a user may choose an event or other defined set of visual objects that are to be displayed using the mosaic view. Method 200 may be implemented by the system automatically responsive to an event such as a user request or the addition of one or more visual objects to a set of visual objects.

In block 205, the system determines aspect ratios of the visual objects to be displayed using the mosaic view. The system may analyze the visual objects to determine the aspect ratios. As defined within this disclosure, the term "aspect ratio" means the ratio of frame width to frame height for a digital object. In one embodiment, in the case of a document, aspect ratio may refer to the width of the printable area to the height of the printable area of the document. For example, a document having a page layout of 8.5×11 inches may have an aspect ratio of 8.5×11.

In one arrangement, the system may analyze and recognize the aspect ratios of visual objects as square, portrait, landscape, or panorama. For example, in the case of a document, a word processing document, spreadsheet, or presentation may have a portrait, landscape, or square aspect ratio depending upon the specified orientation of the document, printable area, or the like. In illustration, an 8.5×11 document may have a portrait aspect ratio when in portrait orientation or a landscape aspect ratio when in landscape orientation. In another example, documents may have a default aspect ratio of square.

In block 210, the system associates the visual objects with thumbnail sizes according to aspect ratios. In illustration, the system may associate each visual object with one or more different, predetermined thumbnail sizes based upon the aspect ratio of the digital object. The system may associate thumbnail sizes with digital objects by tagging, making entries in a database, or using another suitable data structure to store the associations in memory. In one aspect, each of the different, predetermined thumbnail sizes may be defined as a grid formed of one or more square blocks, where a block is a basic unit of measure that may not be further subdivided. Thumbnail sizes are described in greater detail with reference to FIG. 3.

In block 215, the system determines a layout of thumbnails for the visual objects. The system determines the layout according to chronological order of the visual objects and the thumbnail sizes associated with each of the visual objects that are to be displayed in the mosaic view. The term "chronological order" means both a time ordering from newest to oldest (reverse chronological) and a time ordering from oldest to newest (forward chronological) unless specifically stated to be forward chronological or reverse chronological. Using the chronological order and the thumbnail sizes, the system determines the layout. The layout may specify a particular thumbnail size and location of the thumbnail for each of the visual objects. In determining the layout, the system generates the thumbnails for the visual objects in accordance with the determined layout. In one aspect, the system may utilize additional attributes for selecting the thumbnail size to be used for one or more or each of the visual objects within the layout. Further aspects of thumbnail selection are described in greater detail below.

In block 220, the system displays the thumbnails of the visual objects using the layout. It should be appreciated that FIG. 2 illustrates a method of presenting thumbnails where the layout is determined by the system dynamically. For example, responsive to a user input to display a set of visual objects, the system may perform method 200 dynamically or at least perform block 215 dynamically. As new visual objects are added to the set, the system may regenerate the layout.

Figure 3:
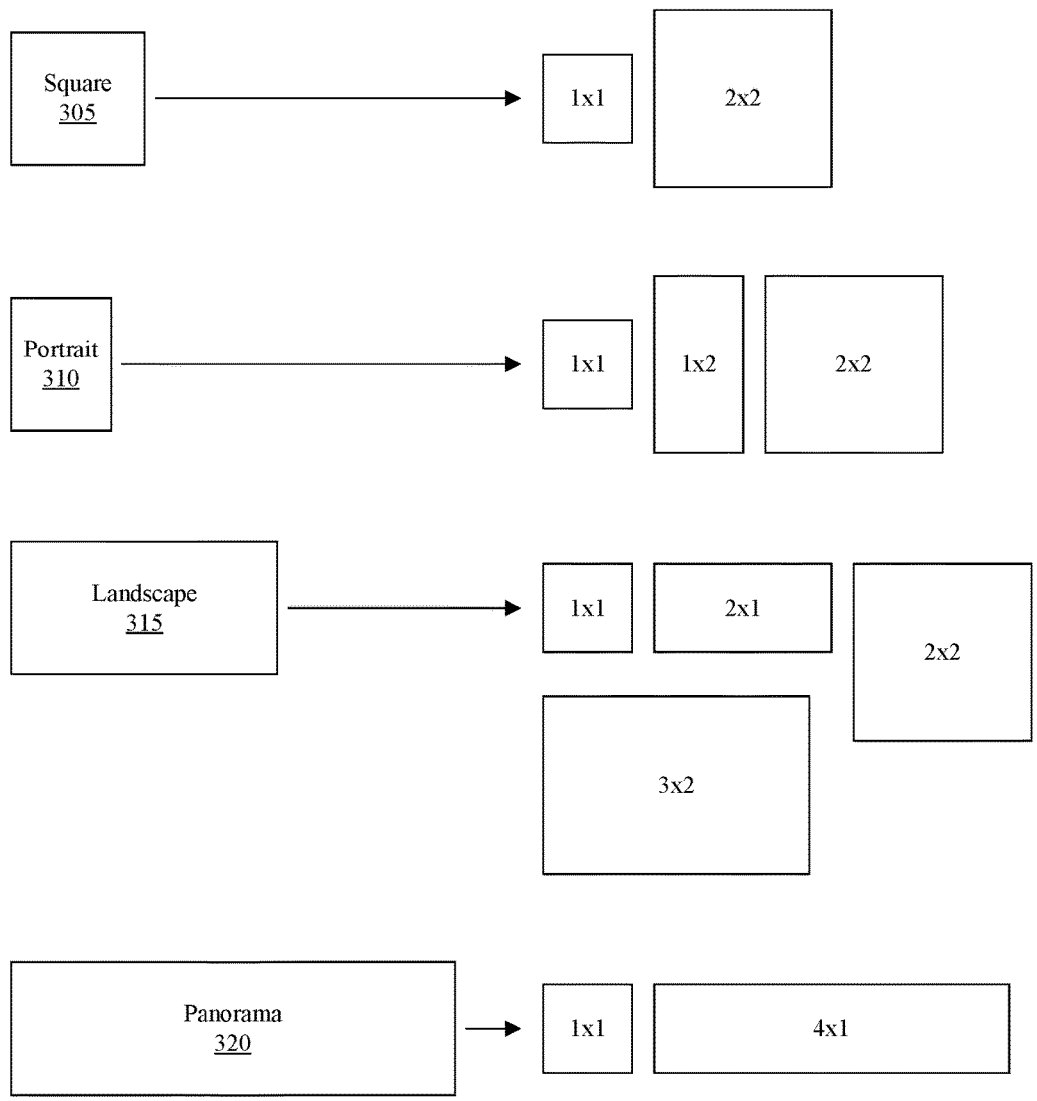
FIG. 3 is a diagram illustrating exemplary thumbnail sizes for visual objects.

FIG. 3 is a diagram illustrating exemplary thumbnail sizes for visual objects. Aspect ratios of square 305, portrait 310, landscape 315, and panorama 320 are pictured on the left side of the arrows shown in FIG. 3. Thumbnail sizes are pictured on the right side of the arrows shown in FIG. 3. The thumbnail sizes are defined as width×height using blocks. As noted a block is square in shape.

FIG. 3 illustrates that a visual object determined to have square aspect ratio 305 may be represented using a 1×1 thumbnail size or a 2×2 thumbnail size. Accordingly, in block 210 of FIG. 2, the system associates each visual object determined to have square aspect ratio 305 with a 1×1 thumbnail size and a 2×2 thumbnail size.

A visual object determined to have portrait aspect ratio 310 may be represented using 1×1 thumbnail size, a 1×2 thumbnail size, or a 2×2 thumbnail size. Accordingly, in block 210 of FIG. 2, the system associates each visual object determined to have portrait aspect ratio 310 with a 1×1 thumbnail size, a 1×2 thumbnail size, and a 2×2 thumbnail size.

A visual object determined to have landscape aspect ratio 315 may be represented using 1×1 thumbnail size, a 2×1 thumbnail size, a 2×2 thumbnail size, or 3×2 thumbnail size. Accordingly, in block 210 of FIG. 2, the system associates each visual object determined to have landscape aspect ratio 315 with a 1×1 thumbnail size, a 2×1 thumbnail size, a 2×2 thumbnail size, and a 3×2 thumbnail size.

A visual object determined to have panorama aspect ratio 320 may be represented using 1×1 thumbnail size or a 4×1 thumbnail size. Accordingly, in block 210 of FIG. 2, the system associates each visual object determined to have panorama aspect ratio 320 with a 1×1 thumbnail size and a 4×1 thumbnail size.

The system associates each visual object with each potential thumbnail size available for the determined aspect ratio. The particular thumbnail size used for the thumbnail of a particular visual object in the layout is selected from the thumbnail sizes associated with the visual object at the time of layout generation.

Figure 4:
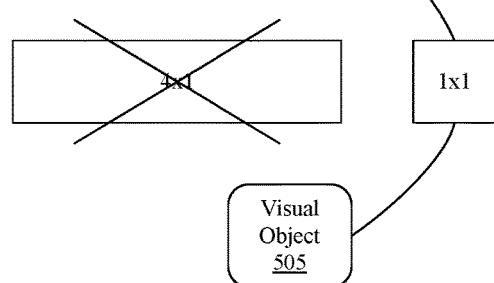
FIG. 4 is a diagram illustrating an exemplary layout for displaying thumbnails of visual objects.

FIG. 4 is a diagram illustrating an exemplary layout for displaying thumbnails of visual objects. The layouts shown in FIG. 4 may be used to display visual objects on a display of a computing device such as the system described with reference to FIG. 1. FIG. 4 illustrates a first conventional layout 405 where the thumbnails are uniform in size. In the example of FIG. 4, layout 405 has square shaped thumbnails that are used regardless of the aspect ratio of the visual objects for which the thumbnails are generated.

Layout 410 is a mosaic layout created in accordance with the inventive arrangements disclosed herein. In general, layout 410 is formed of a plurality of rows 415, 420, 425, 430, 435, and 440. For purposes of discussion, two adjacent rows form a sequence. As pictured, rows 415 and 420 form sequence 445. Rows 425 and 430 form sequence 450. Rows 435 and 440 form sequence 455.

For purposes of illustration and discussion in FIG. 4, thumbnails and visual objects for which the thumbnails are generated are referred to using the same reference number. For example, visual objects 1-12 are represented in layout 405 by thumbnails 1-12, where thumbnail 1 is for visual object 1, thumbnail 2 is for visual object 2, etc. The same numbering scheme is used in layout 410 to illustrate the variation in thumbnail size that is achieved using the inventive arrangements described herein. Thus, referring to layout 410, row 415 is formed of thumbnail 1 and the top portions of thumbnails 2 and 3. Row 420 is formed of thumbnail 4 and the bottom portions of thumbnails 2 and 3. Row 425 is formed of the top portion of thumbnail 5 and thumbnail 6. Row 430 is formed of the bottom portion of thumbnail 5 and thumbnail 7. Row 435 is formed of thumbnails 8 and 9. Row 440 is formed of thumbnails 10, 11, and 12.

While one or more visual objects may still be represented using 1×1 thumbnail sizes, a plurality of other visual objects are represented using different thumbnail sizes. For example, visual objects 1, 4, 6, 7, 10, and 12 are represented using the 1×1 thumbnail size. Visual object 2 is represented using the 2×2 thumbnail size. Visual object 3 is represented using the 1×2 thumbnail size. Visual object 5 is represented using the 3×2 thumbnail size. Visual objects 8, 9, and 11 are represented using the 2×1 thumbnail size.

In one embodiment, in generating layout 410, the system may create sequence 445, then sequence 450, followed by sequence 455. Further, sequences may be generated row by row working from left to right. For example, the system may fill row 415 working from left to right and then fill row 420 working from left to right.

As illustrated in FIG. 3, each different aspect ratio may be represented using a 1×1 thumbnail size. Accordingly, a 1×1 thumbnail size is always an available option for representing a visual object. In some cases, however, different or larger thumbnail sizes may be selected for representing a visual object. For example, additional attributes such as detected visual features and/or metadata for a visual object may be analyzed and used to select a particular thumbnail size for a visual object when more than one thumbnail size is available.

As an illustrative example, visual objects 2 and 5 may be displayed using the larger thumbnail sizes responsive to (1) determining that the larger thumbnail sizes are associated with visual objects 2 and 5; (2) determining that sufficient empty space exists to fit a larger sized thumbnail; and (3) detecting particular attributes from the metadata of the visual objects such as a favorite status, a particular user rating above a threshold user rating, a number of views of the visual object, or the like. In another example, visual object 3 may be displayed using the 1×2 thumbnail size responsive to (1) determining that the 1×2 thumbnail size is associated with visual object 3; (2) determining that sufficient empty space exists to fit the larger thumbnail size; and (3) detecting vertically oriented visual features within the visual object. Similarly, visual objects 8, 9, and 11 may be displayed using the 2×1 thumbnail sizes responsive to determining that (1) the 2×1 thumbnail size is associated with each of visual objects 8, 9, and 11; (2) there is sufficient empty space to fit the larger thumbnail size; and (3) detecting a horizontally oriented visual feature within each of visual objects 8, 9, and 11.

Within this disclosure, the term "upsizing condition" means any attribute of a visual object that causes the system to select a thumbnail size that is larger than the minimum thumbnail size available for the visual object. An attribute may be an item of metadata or a visual feature of a visual object. Examples of upsizing conditions include, but are not limited to, detecting one or more particular attributes of metadata of a visual object such as a favorite status, a particular user rating above a threshold user rating, a number of views of the visual object exceeding a threshold, or the like. Other examples of upsizing conditions include, but are not limited to, detecting particular visual features within content of a visual object such as a vertically oriented visual feature, a horizontally oriented visual feature, one or more colors, one or more textures, one or more objects such as a face, a human being, or the like. Further examples of upsizing conditions and applications of upsizing conditions to thumbnail generation for visual objects are described in greater detail below.

FIGS. 5-8 are diagrams illustrating exemplary operations for generating a layout. The operations described in FIGS. 5-8 may be performed by a system such as system 100 of FIG. 1 in generating a layout and displaying thumbnails in accordance with the generated layout.

Figure 5:
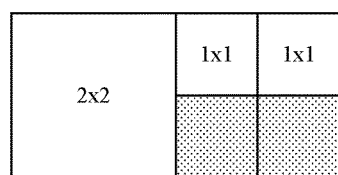
FIGS. 5-8 are diagrams illustrating exemplary operations for generating a layout.

FIG. 5 illustrates an exemplary sequence 500 formed by the system. The system has generated a 2×2 thumbnail size for the leftmost portion of sequence 500. The top row of sequence 500 is completed with two 1×1 thumbnail sizes for two other visual objects. The shaded blocks represented portions of sequence 500 where no thumbnail has been generated or assigned (i.e., empty space). As pictured, sequence 500 has only two remaining 1×1 blocks in the second row.

In this example, the system has generated a 4×1 thumbnail size for visual object 505. The system determines that the 4×1 thumbnail size will not fit the empty space in sequence 500 and, in response to the determination, generates a 1×1 thumbnail size for visual object 505. Visual object 505 has a panorama aspect ratio and, as such, may have thumbnail sizes of 1×1 or 4×1. In this case, the system regenerates locates the 1×1 thumbnail of visual object 505 to one block of the shaded portion of sequence 500. The system may select a next visual object that has an associated thumbnail size of 1×1 and place the 1×1 thumbnail in the remaining shaded block of sequence 500 to complete the row.

Figure 6:
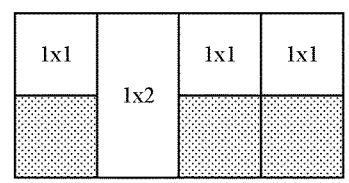

FIG. 6 illustrates an exemplary sequence 600 formed by the system. The system has generated a 1×1 thumbnail size in the top row, followed by a 1×2 thumbnail size, followed by a 1×1 thumbnail size, and another 1×1 thumbnail size. The first row of sequence 600 is full. Accordingly, any block that has a height of more than one block will not fit in into the empty space in the second row of sequence 600. In the example of FIG. 6, the next visual object has a thumbnail size of 1×2 that the system may not use in filling the empty space of the second row of sequence 600.

Figure 7:
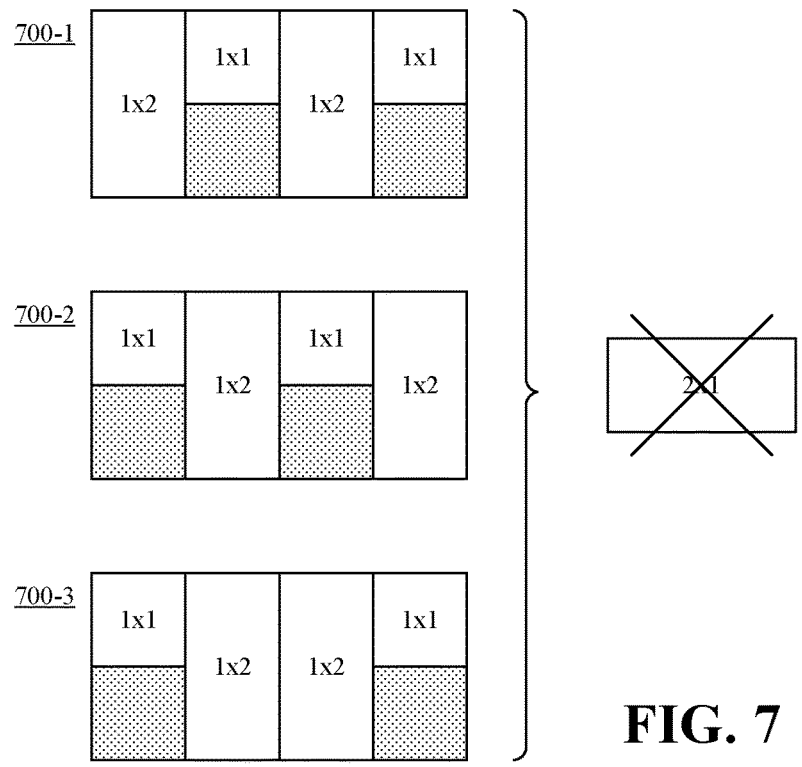

FIG. 7 illustrates exemplary sequences 700-1, 700-2, and 700-3 formed by the system where each sequence has a different placement of thumbnails. In each case, the system has generated two 1×1 thumbnail sizes and two 1×2 thumbnail sizes to fill the first row. Again, empty space is shown as shaded blocks. In the example of FIG. 7, each of sequences 700-1, 700-2, and 700-3 has a second row that is divided into two columns, e.g., has two empty blocks. The two empty blocks in the second row are not contiguous or adjacent in any of the placements shown. Further, each row is only one block in height. Accordingly, any block that has a height of more than one block will not fit in into the empty space in the second row of sequences 700-1, 700-2, or 700-3. In the example of FIG. 7, the next visual object has a thumbnail size of 2×1 that the system may not use in filling the empty space of the second row for any of sequences 700-1, 700-2, or 700-3.

Figure 8:
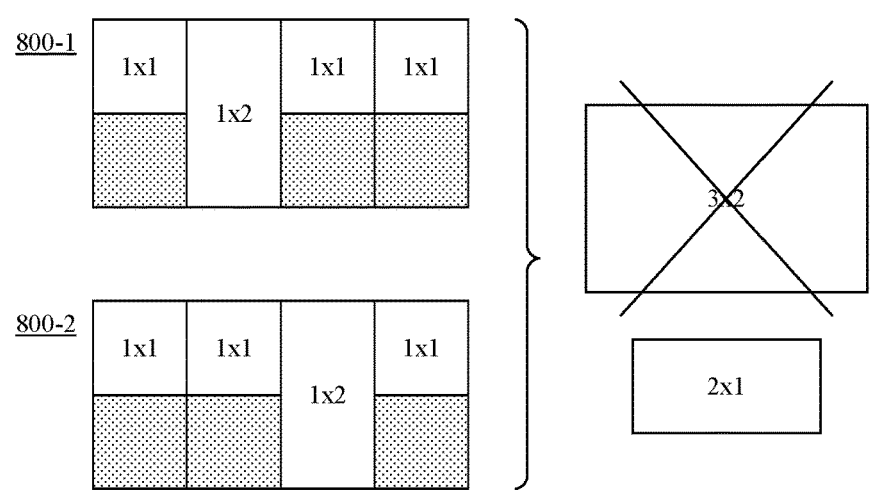

FIG. 8 illustrates exemplary sequences 800-1 and 800-2 formed by the system. The system has selected three 1×1 thumbnail sizes and one 1×2 thumbnail size to fill the first row of each of the sequences. FIG. 8 illustrates different placements shown as sequences 800-1 and 800-2 for the four thumbnail sizes noted. In each case, the resulting empty space in the second row is shown as shaded blocks. In the example of FIG. 8, each of sequences 800-1 and 800-2 has a second row that is divided into two columns. Because only one of the thumbnails in the first row is 1×2, there are three available 1×1 blocks in the second row. Further, the three available 1×1 blocks are not contiguous in any of the placements shown. Instead, the second row is divided into two columns where one column is one 1×1 block in width and the other column is two 1×1 blocks in width. Accordingly, any thumbnail that has a width of more than two blocks or a height of more than one block will not fit in into the empty space in the second row of sequences 800-1 or 800-2. In the example of FIG. 8, the next visual object has a thumbnail size of 3×2 that the system may not use in filling the remainder of the second row. Since any visual object having a 3×2 thumbnail size may also have a 2×1 or a 1×1 thumbnail size, the system may generate a thumbnail having a size of 2×1 for inclusion in the available space of the second row of either one of sequences 800-1 or 800-2.

Figure 9:
FIG. 9 is a diagram illustrating examples of allowable sequence placements for a last sequence of a layout.
Figure 9:
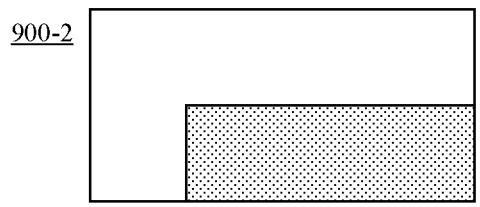
Figure 9:
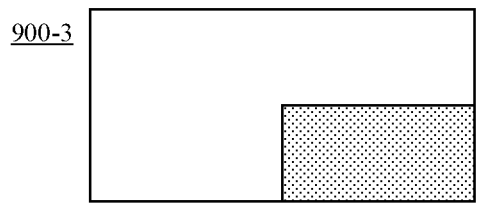
Figure 9:

FIG. 9 is a diagram illustrating allowable sequence placements for a last sequence of a layout. More particularly, FIG. 9 illustrates exemplary processing for implementing the last sequence of a layout. In each exemplary sequence placement of FIG. 9, occupied space is shown without shading and empty space is show with shading. FIG. 9 illustrates that, to the extent any empty space exists in the last sequence of a layout, the empty space is aligned to the right side. The last sequence of the layout does not include any empty blocks located to the left of any occupied block. Sequences 900-1, 900-2, 900-3, and 900-4 are allowable, or legal, sequence placements for a last sequence of a layout. As pictured, the empty space is located in the second row and not in the top row. Further, any empty space is aligned to the right.

In one embodiment, responsive to determining that the last sequence has a placement other than those illustrated in FIG. 9 as allowable, the system may regenerate the last sequence until a sequence having a placement matching one of allowable sequence placements 900-1, 900-2, 900-3, or 900-4 is found.

Figure 10:
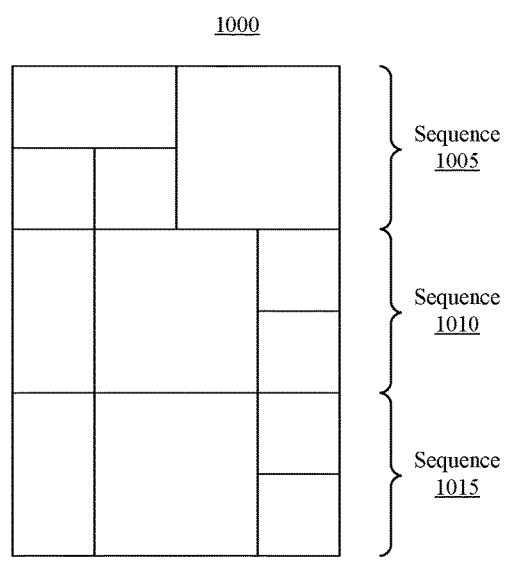
FIG. 10 is a diagram illustrating an exemplary layout.

FIG. 10 is a diagram illustrating an exemplary layout 1000. FIG. 10 illustrates an example of a sequence checking operation that is performed by the system during layout generation. Layout 1000 is a mosaic layout that includes sequences 1005, 1010, and 1015. Sequence 1010 differs from sequence 1005. Sequence 1015, however, is the same as sequence 1010. More particularly, the placement of thumbnail sizes across both rows of sequences 1010 and 1015 is identical. In accordance with one embodiment, the system may monitor for the occurrence of two identical or same sequential sequences. Responsive to detecting two adjacent sequences that are identical, the system may re-create the second of the two sequences. In this example, responsive to detecting that sequence 1015 is the same as sequence 1010, the system recreates sequence 1015 with a different placement (e.g., different thumbnail sizes, different ordering, and/or thumbnails for different visual objects).

Figure 11:
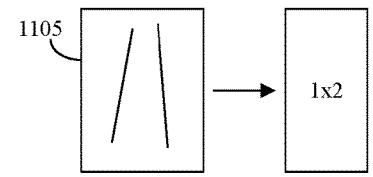
FIGS. 11-15 are diagrams illustrating exemplary operations for generating a layout.

FIG. 11 is a diagram illustrating exemplary operations for generating a layout. FIG. 11 illustrates an example where a visual object 1105 has a portrait aspect ratio. Within visual object 1105, the system detects visual features such as lines with a vertical orientation. In the example shown, the detected features extend across substantially the entire height of visual object 1105. Accordingly, the system, in response to detecting the visual features, selects thumbnail size 1×2 for visual object 1105 instead of thumbnail size 1×1.

Figure 12:
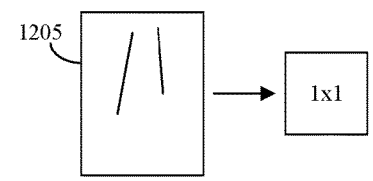

FIG. 12 is a diagram illustrating exemplary operations for generating a layout. FIG. 12 illustrates an example where a visual object 1205 has a portrait aspect ratio. Within visual object 1205, the system detects visual features such as lines with a vertical orientation. In the example shown, the detected features do not extend across substantially the entire height of visual object 1205. Accordingly, the system, in response to detecting the visual features, selects thumbnail size 1×1 for visual object 1205 instead of thumbnail size 1×2.

Figure 13:
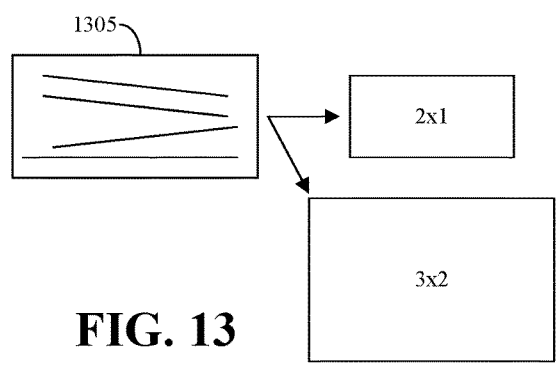

FIG. 13 is a diagram illustrating exemplary operations for generating a layout. FIG. 13 illustrates an example where a visual object 1305 has a landscape aspect ratio. Within visual object 1305, the system detects visual features such as lines with a horizontal orientation. In the example shown, the detected features extend substantially across the entire width of visual object 1305. Accordingly, the system, in response to detecting the visual features, selects either thumbnail size 2×1 or thumbnail size 3×2 for visual object 1305.

Figure 14:
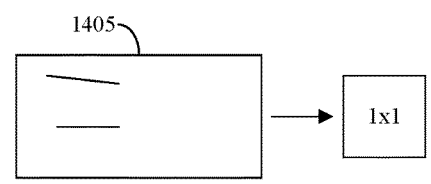

FIG. 14 is a diagram illustrating exemplary operations for generating a layout. FIG. 14 illustrates an example where a visual object 1405 has a landscape aspect ratio. Within visual object 1405, the system detects visual features such as lines with a horizontal orientation. In the example shown, the detected features do not extend substantially across the entire width of visual object 1405. Accordingly, the system, in response to detecting the visual features, selects thumbnail size 1×1 for visual object 1405.

Figure 15:
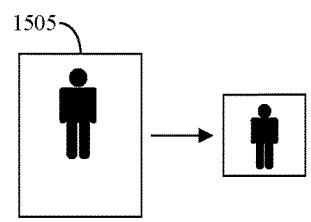

FIG. 15 is a diagram illustrating exemplary operations for generating a layout. FIG. 15 illustrates an example where a visual object 1505 has a portrait aspect ratio. Within visual object 1505, the system has detected one or more visual features and identified the a human being therein. The system further may determine that the lower portion of visual object 1505 does not include a significant number of features or other detail. Accordingly, the system selects a 1×1 thumbnail size. Further, FIG. 15 illustrates that in generating the thumbnail, the system includes the area of the visual object that includes the detected visual features (or objects as the case may be) in the thumbnails so that the detected features are visible in the generated thumbnail. Areas of visual object 1505 that lack visual features and/or detail may be cropped so that the areas that do include detected visual features are included in the thumbnail that is generated. While this technique is described with reference to FIG. 15, it should be appreciated that similar processing may be applied to FIGS. 11-14, where the portion of the visual object that includes the detected visual features is included for display within the thumbnail that is generated for the visual object while areas determined to lack visual features are cropped.

Figure 16:
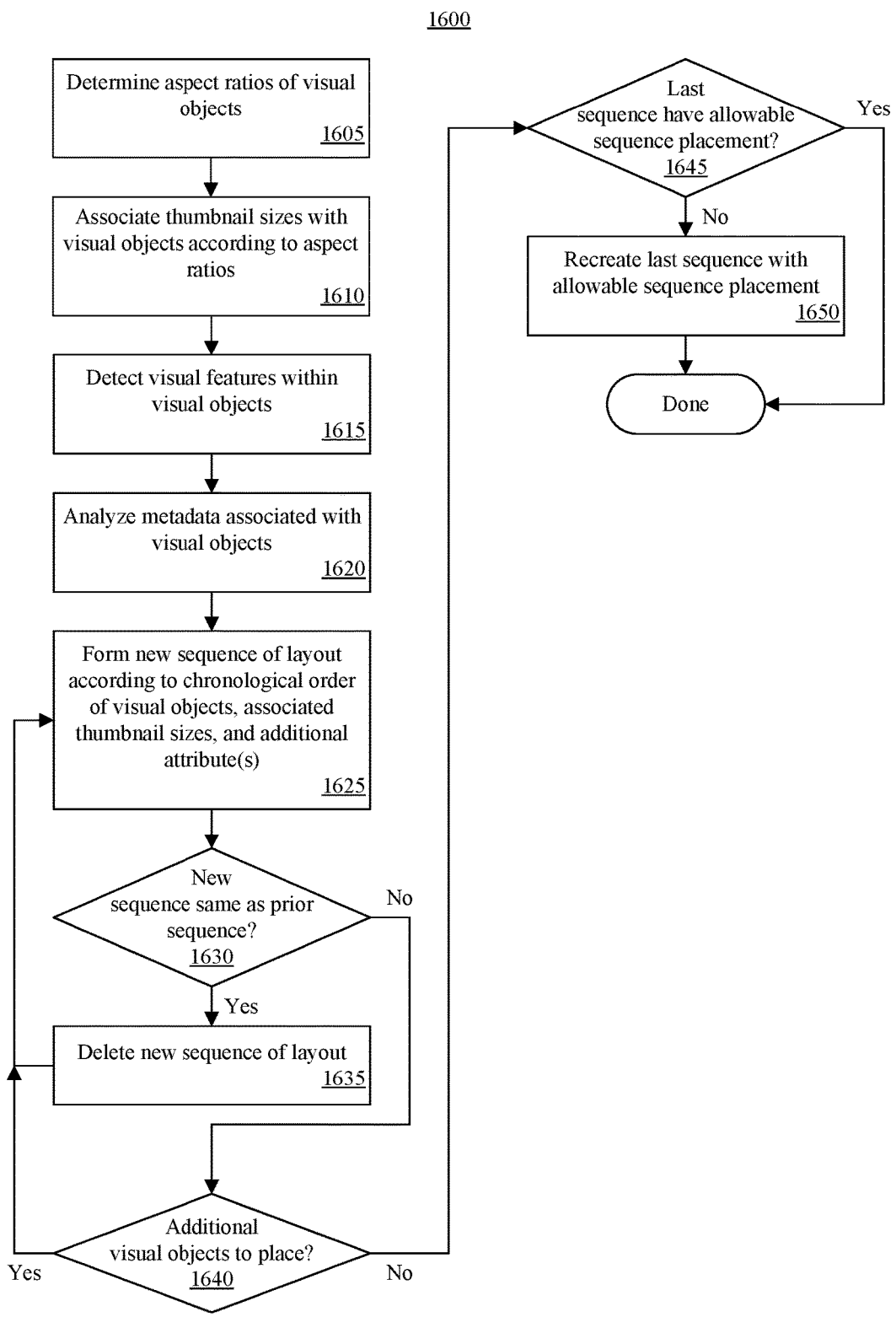
FIG. 16 is a flow chart illustrating another exemplary method of presenting thumbnails of visual objects.

FIG. 16 is a flow chart illustrating another exemplary method 1600 of presenting thumbnails of visual objects. Method 1600 may be implemented by a system as described with reference to FIG. 1. Method 1600 illustrates a more detailed implementation that incorporates additional attributes of the visual objects for purposes of generating the layout of thumbnails. Method 1600 may begin in a state where a plurality of visual objects to be displayed using a mosaic layout are stored within the system. Method 1600 may be implemented by the system automatically responsive to an event such as a user request or the addition of one or more visual objects to a set of visual objects.

In block 1605, the system determines aspect ratios of the visual objects. In block 1610, the system associates the visual objects with thumbnail sizes according to the aspect ratios. In block 1615, the system may detect one or more visual features within the visual objects. For example, the system may analyze the content of the visual objects to detect particular features such as lines having a particular orientation (e.g., vertical, horizontal, diagonal), colors, textures, and the like. In one arrangement, the system may detect visual features as part of performing object recognition on the visual objects. The system may use feature detection, matching, pattern recognition, or other image processing techniques to identify images of physical objects appearing in the visual objects.

In block 1620, the system may analyze metadata associated with the visual objects. The system may determine one or more attributes from the metadata associated with the visual objects. For example, for a given visual object, the system may determine a number of times the visual object was viewed whether on a particular device or by other users accessing the visual object through social media Websites, the number of times the visual object has been shared through one or more social media Websites, the number of "likes" or other positive sentiment indications for the visual object from one or more social media Websites, whether the visual object is marked as a favorite or highly rated by the user (i.e., the owner of the visual object) through sentiment indicators such as stars or the like.

Starting in block 1625, the system begins to generate the layout that will be used to display thumbnails for the visual objects. In block 1625, the system generates a new sequence for the layout. The system uses chronological order of the visual objects and the associated thumbnail sizes in determining the layout. Further, the system uses one or more of the additional attributes described with reference to block 1615 and/or block 1620.

The system selects a thumbnail size for a visual object for use in the layout from the set of thumbnail sizes associated with the visual object from block 1610. In one example, the system randomly selects a thumbnail size from the set of associated thumbnail sizes for the visual object. In another example, the system utilizes one or more of the additional attributes determined in block 1615 and/or 1620 to select a particular thumbnail size for a visual object from the thumbnail sizes associated with that visual object.

In one embodiment, responsive to determining that a visual object meets a particular upsizing condition, the system selects a larger thumbnail size from the thumbnail sizes associated with the visual object. For example, responsive to determining that a visual object has an amount of detail that exceeds a threshold amount of detail as determined from detected visual features, the system selects a larger thumbnail size from the set of associated thumbnail sizes for the visual object. In another example, responsive to detecting a particular visual feature within a visual object, e.g., a face, a person, a landscape, etc., the system selects a larger thumbnail size from the set of associated thumbnail sizes for the visual object.

In another example, responsive to determining that a visual object has a metadata attribute that meets or exceeds a threshold, e.g., meets an upsizing condition, the system selects a larger thumbnail size from the set of associated thumbnail sizes for the visual object. As discussed, the system may determine one or more attributes such as the number of times that the visual object was viewed whether on a particular device or by other users accessing the visual object through social media Websites, the number of times the visual object has been shared through one or more social media Websites, the number of "likes" or other positive sentiment indications for the visual image from one or more social media Websites, whether the visual object is marked as a favorite or highly rated by the user (i.e., the owner of the visual object) through sentiment indicators such as stars or the like. The system may compare one or more or a combination of these attributes to one or more conditions and, responsive to determining that the attributes meet the condition, select a larger thumbnail size from the set of thumbnail sizes associated with the visual object.

In one embodiment, the system may use a combination of the various attributes disclosed herein to determine a score for a visual object. The system may assign a weighting factor to each of the attributes used to set the relative importance of the attributes and compute the score as a sum of the weighted attributes. Responsive to the score meeting an upsizing condition, i.e., exceeding a threshold, the system may select a larger thumbnail size for the visual object than would otherwise be the case. For example, each visual object, regardless of aspect ratio, may be represented using a 1×1 thumbnail size. Responsive to meeting a condition as described herein, the system may select the next largest thumbnail size associated with the visual object.

In a further embodiment, multiple conditions may be established so that the score of a visual object exceeding a first (e.g., lowest) threshold causes the system to select a next larger thumbnail size up from the 1×1 thumbnail size for the visual object. For example, in the case of a visual object having a landscape aspect ratio, the system may select the 2×1 thumbnail size. Responsive to the score of the visual object exceeding a second threshold that is higher than the first threshold, the system may select a next larger thumbnail size. Referring to the prior example of a digital object having a landscape aspect ratio, the system would select a 3×2 thumbnail size.

As noted, as part of sequence generation, the system generates thumbnails for the visual objects. The system may generate a thumbnail for a visual object as that visual object is selected for placement in the layout according to chronological order and associated thumbnail sizes. In one aspect, the chronological order of the layout may be reverse chronological order with the thumbnails for the most recent visual objects being displayed starting at the top and moving from left to right. The system may generate a sequence by filling up spaces one by one for the two rows forming the sequence. In another aspect, forward chronological order may be used. In any case, visual objects may be assigned greater prominence by using larger thumbnail sizes as described above. Further, additional rules for filling in empty space in the sequence as described with reference to FIGS. 5-8 may be used. The system may also generate different thumbnail sizes for visual objects as may be required to fill empty space in the sequence.

In generating the thumbnails, the system generates each thumbnail using the selected thumbnail size and without distortion of the visual object in terms of expansion or reduction in width or height. Further, in determining which portions of the visual object to crop when necessary based upon the selected thumbnail size, the system crops those portions deemed unimportant based upon detection of visual features as described herein. This ensures that the areas of the visual object in which visual features are detected are displayed in the resulting thumbnail of the visual object and are not cropped.

In block 1630, the new sequence formed in block 1625 is compared with the immediately prior or above sequence if one exists. The check in block 1630 ensures that two adjacent sequences are not identical. Responsive to the system determining that the newly generated sequence is identical to the prior generated sequence, method 1600 proceeds to block 1635 where the system deletes the sequence generated in block 1625 and loops back to block 1625 to form a new sequence. In looping back to block 1625 from block 1635, the system makes different selections as to thumbnail size and/or visual object order to form the sequence.

Responsive to the system determining that the new sequence is not the same as the prior sequence, method 1600 continues to block 1640. In block 1640, the system determines whether there are additional visual objects to place. If so, method 1600 loops back to block 1625 to continue processing. If not, method 1600 continues to block 1645.

In block 1645, the system determines whether the last sequence has an allowable sequence placement. If so, method 1600 may end. If not, method 1600 may continue to block 1650, where the last sequence is recreated with an allowable sequence placement.

In one embodiment, in generating the layout, the system may start from the latest visual object in a set or cluster of visual objects that are to be displayed. The remaining visual objects may be added one by one with the system filling space from left to right and then from top to bottom. Based upon whether the attributes of a visual object meet one or more predetermined conditions, the system determines whether the thumbnail size for the visual object should be increased. The system may use larger thumbnail sizes where possible depending upon empty space and whether a given visual object meets the established condition(s). Further, as discussed, for a given layout, no empty space exists on the left.

In another embodiment, the selection of thumbnail size may be randomized so long as specified conditions are met. For example, selection of thumbnail size may be randomized as long as there is enough empty space for the thumbnail size and there are sufficient remaining visual objects to be processed to fill the empty space to achieve a last sequence that has an allowable placement.

Further, the layout generation techniques described herein may be applied dynamically. For example, when a new visual object is added to a set of visual objects to be displayed using a mosaic layout, the layout may be re-evaluated or regenerated to incorporate the newly added visual object.

FIGS. 17-1, 17-2, and 17-3, taken collectively, are flow charts illustrating an exemplary method 1700 of generating a layout for displaying thumbnails of visual objects. Method 1700 may be performed as part of block 215 of FIG. 2 and/or block 1625 of FIG. 16. Method 1700 may be used to select thumbnail sizes and generate thumbnails to create a layout for displaying the thumbnails of the visual objects.

In block 1702, the system determines a current empty space to be filled. For a given sequence, whether new or partially formed, the system finds the top row with the empty space. The system further starts with the leftmost empty space in the selected row, e.g., a 1×1 block of empty space. Responsive to determining that there is no further empty space in a row, the system starts a new row and/or a new sequence as the case may be.

In block 1704, the system determines the height of the current row. The current row is the row including the current empty space determined in block 1702. The current row height may be either one or two. If the system determines that all thumbnails on the left of the currently empty space take two rows, the system determines that the current row height is two. If the system determines that not all thumbnails on the left of the currently empty space take two rows, the system determines that the current row height is one. If the current row is empty, the system determines that the height is two.

Figures 1, 17:
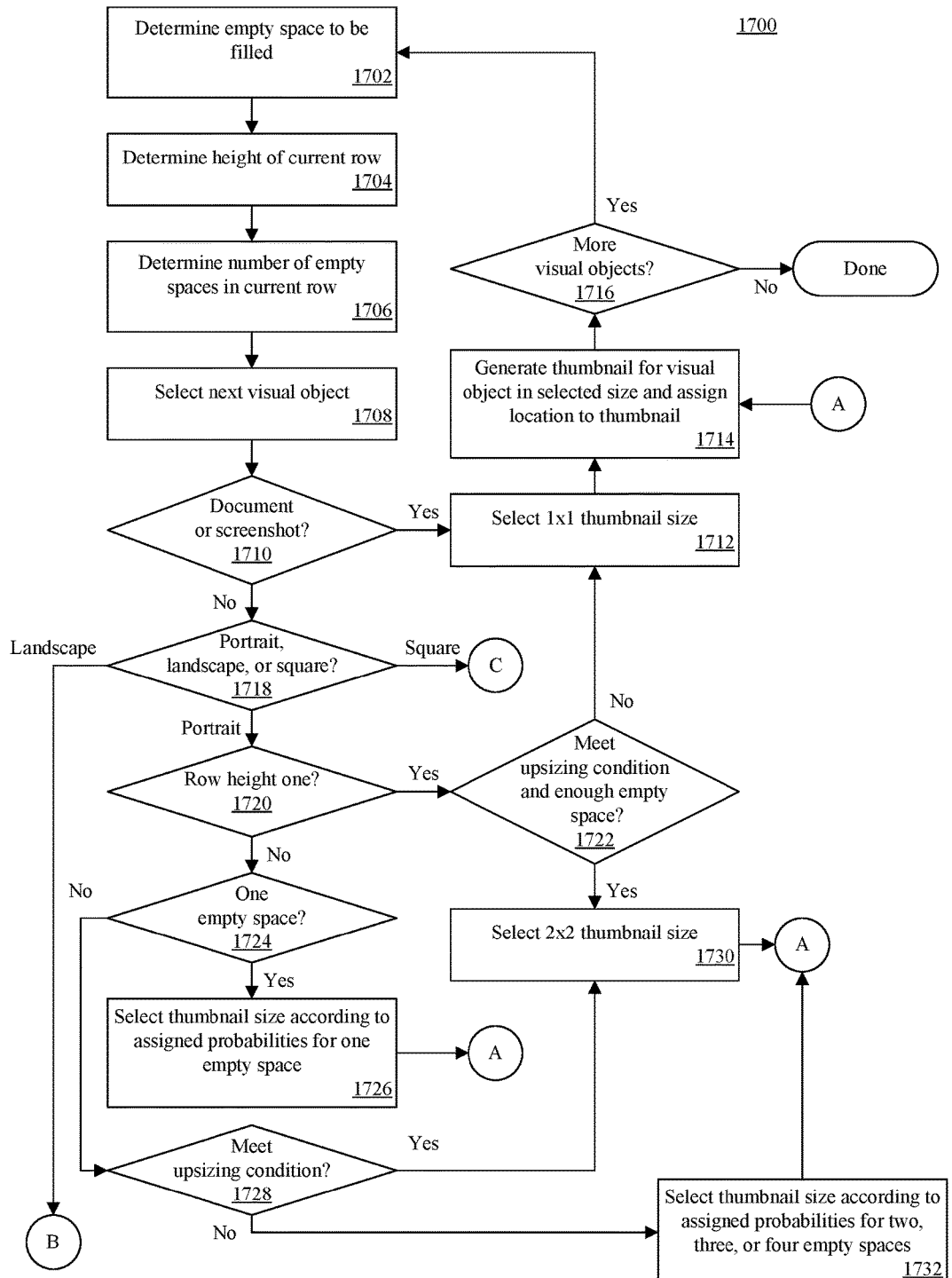
Figures 2, 17:
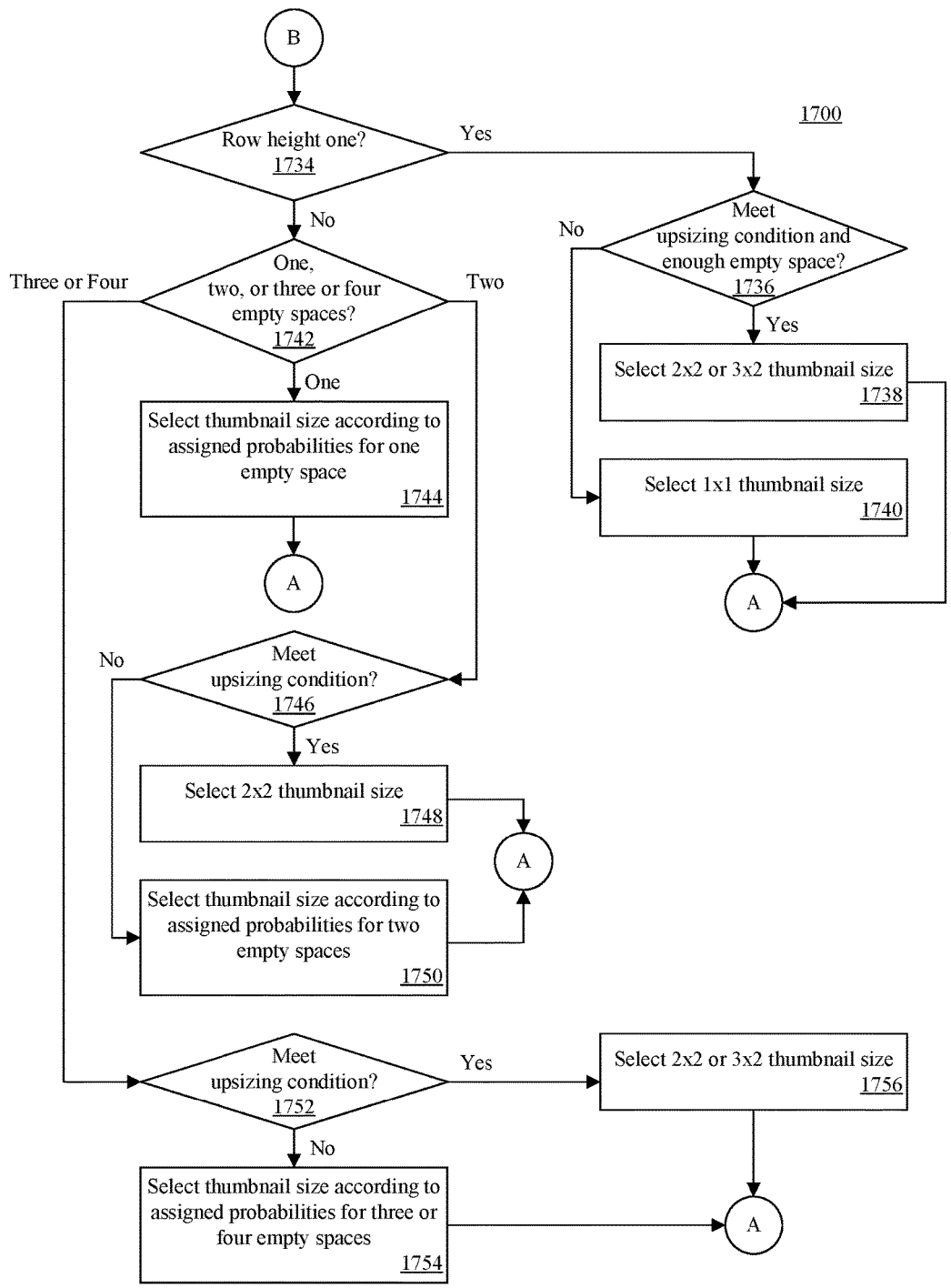
Figures 3, 17:
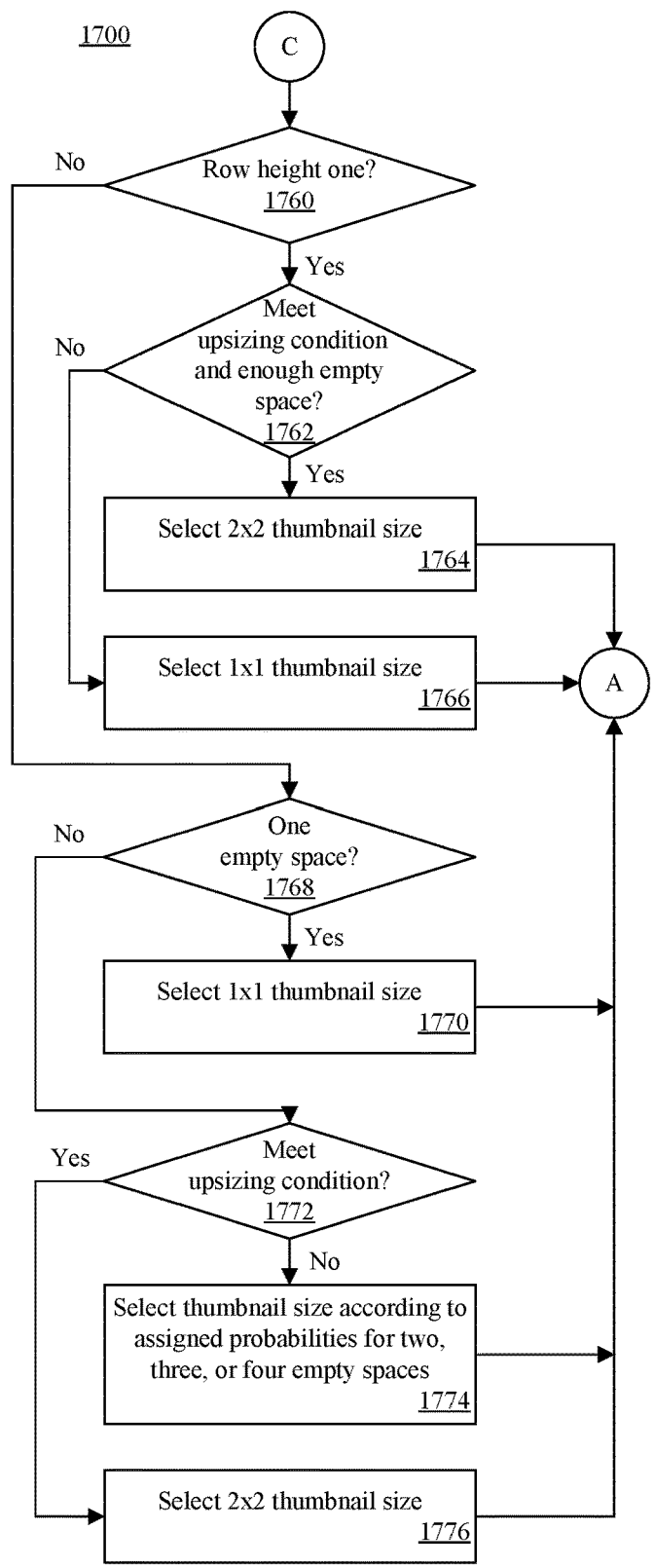

In block 1706, the system determines the number of empty spaces in the current row. For purposes of illustration, the number of remaining empty spaces, presuming that each row includes four 1×1 blocks, is from zero to four. As noted, in the case where a row has zero empty blocks, the system starts a new row that has four empty blocks. In block 1708, the system selects the next visual object to be processed as the "current visual object." In particular, the system selects the next visual object for which a thumbnail size is to be selected and for which a thumbnail is to be generated with the selected thumbnail size. In the example of FIG. 17, the system may use reverse chronological order.

In block 1710, the system determines whether the current visual object is a document or a screenshot. If the current visual object is either a document or a screenshot, method 1700 continues to block 1712, where the system selects a 1×1 thumbnail size for the current visual object. After block 1712, method 1700 continues to block 1714.

In block 1714, the system generates a thumbnail of the selected thumbnail size for the current visual object. Further, the system assigns a location to the generated thumbnail within the layout. For example, the system assigns a location so that the top left corner of the thumbnail that is generated is placed at the top left corner of the current empty space in the current row.

In block 1716, the system determines whether any further visual objects remain to be processed. If so, method 1700 continues to block 1702 to continue processing. If not, method 1700 may end.

If the current visual object is not a document or a screen shot, method 1700 proceeds from block 1710 to block 1718. In block 1718, the system determines whether the current visual object has an aspect ratio of portrait, landscape, or square. Responsive to determining that the current visual object has a portrait aspect ratio, method 1700 continues to block 1720. Responsive to determining that the current visual object has a landscape aspect ratio, method 1700 continues to block 1736. Responsive to determining that the current visual object has a square aspect ratio, method 1700 proceeds to block 1760.

Proceeding to block 1720, in the case where the current visual object has a portrait aspect ratio, the system determines whether the height of the current row is one. If so, method 1700 continues to block 1722. If not, method 1700 continues to block 1724.

In block 1722, the system determines whether the current visual object meets an upsizing condition and whether there is sufficient empty space to fit a 2×2 thumbnail size. If the current visual object meets an upsizing condition and there is enough empty space to fit a 2×2 thumbnail size, method 1700 continues to block 1730, where the system selects a 2×2 thumbnail size. After block 1730, method 1700 continues to block 1714 to continue processing. If the system determines that the current visual object does not meet an upsizing condition or the visual object does meet an upsizing condition but there is not enough empty space to fit a 2×2 thumbnail size, method 1700 continues to block 1712, where a 1×1 thumbnail size is selected for the current visual object. After block 1712, the system may continue processing as described.

In the case where the current visual object has a portrait aspect ratio and the row height is not one, method 1700 continues to block 1724 from block 1720. In block 1724, the system determines whether there is one empty space in the current row. If so, method 1700 continues to block 1726. In block 1726, the system selects a thumbnail size for the current visual object using one or more probabilities. In one embodiment, the system may assign a 50% probability to the 1×1 thumbnail size assign a 50% probability to a 1×2 thumbnail size. The system selects between the two thumbnail sizes with a probability of selecting either one set to 50%. After block 1726, method 1700 proceeds to block 1714 to continue processing.

Continuing to block 1728 from block 1724, where the current row has more than one empty space, the system determines whether the current visual object meets an upsizing condition. If so, method 1700 continues to block 1730 where the system selects a 2×2 thumbnail size for the current visual object. After block 1730, method 1700 continues to block 1714 to continue processing as described. If the system determines that the current visual object does not meet an upsizing condition in block 1728, method 1700 proceeds to block 1732. In block 1732, the system selects a thumbnail size for the current visual object according to assigned probabilities in the case where the current row has 2, 3, or 4 empty spaces. In one embodiment, the system assigns a 40% probability to the 1×1 thumbnail size, a 40% probability to the 1×2 thumbnail size, and a 20% probability to the 2×2 thumbnail size. The system selects the 1×1, 1×2, or 2×2 thumbnail size according to the assigned probabilities. After block 1732, method 1700 continues to block 1714 to continue processing.

Proceeding to block 1734, where the system has determined that the current visual object has a landscape aspect ratio, the system determines whether the row height of the current row is one. If so, method 1700 proceeds to block 1736. If not, method 1700 continues to block 1742.

In block 1736, where the system determines that the current row height is one, the system determines whether the current visual object meets an upsizing condition and whether there is sufficient empty space for either a 2×2 or a 3×2 thumbnail size. If the current visual object meets an upsizing condition and there is sufficient empty space for either a 2×2 or a 3×2 thumbnail size, method 1700 continues to block 1738 where the system selects a 2×2 or a 3×2 thumbnail size for the current visual object. In one aspect, the system may select either the 2×2 thumbnail size or the 3×2 thumbnail size according to empty space. For example, the system selects the 3×2 thumbnail size if there is sufficient empty space to fit the selected thumbnail size. Otherwise, the system selects the 2×2 thumbnail size. In another aspect, the system may assign a probability to each of the two thumbnail sizes and utilize the probability to select a thumbnail size where there is enough empty space to fit either the 2×2 or the 3×2 thumbnail size. After block 1738, method 1700 continues to block 1714 to continue processing.

If the system determines that the current visible object does not meet an upsizing condition or that the current visible object meets an upsizing condition but there is not enough empty space to fit either a 2×2 or a 3×2 thumbnail size, method 1700 continues to block 1740. In block 1740, the system selects a 1×1 thumbnail size for the current visual object. After block 1740, method 1700 continues to block 1714 to continue processing.

Continuing with block 1742 in the case where the aspect ratio of the current visual object is landscape and the row height is two, the system determines whether the number of empty spaces is one, two, or three or four. Responsive to the system determining that the number of available spaces in the current row is one, method 1700 continues to block 1744. Responsive to the system determining that the number of available spaces in the current row is two, method 1700 continues to block 1746. Responsive to the system determining that the number of available spaces in the current row is either three or four, method 1700 continues to block 1752.

In block 1744, where the number of available spaces is one, the system selects a thumbnail size according to assigned probabilities in the case of one empty space. In one embodiment, the system assigns a 50% probability to the thumbnail size of 1×1 and a 50% probability to the thumbnail size of 2×1. The system selects a thumbnail size using the assigned probabilities. After block 1744, method 1700 proceeds to block 1714 to continue processing.

In block 1746, where the number of available spaces is two, the system determines whether the current visual object meets an upsizing condition. If so, method 1700 continues to block 1748 where the thumbnail size is selected as 2×2. After block 1748, method 1700 proceeds to block 1714 to continue processing. If the current visual object does not meet an upsizing condition, method 1700 continues to block 1750. In block 1750, the system selects a thumbnail size for the current visual object according to assigned probabilities for the case of two empty spaces. In one embodiment, the system assigns a 40% probability to the thumbnail size of 1×1, a 40% probability to the thumbnail size of 2×1, and a 20% probability to the thumbnail size of 2×2. The system selects a thumbnail size according to the assigned probabilities. After block 1750, method 1700 proceeds to block 1714 to continue processing.

In block 1752, where the system determines that there are three or four empty spaces, the system determines whether the current visual object meets an upsizing condition. If so, method 1700 continues to block 1756, where the system selects a 2×2 thumbnail size or a 3×2 thumbnail size for the current visual object. In one aspect, the system may select either the 2×2 thumbnail size or the 3×2 thumbnail size according to empty space. In one aspect, the system may assign a probability to each of the two thumbnail sizes and utilize the probability to select a thumbnail size where there is enough empty space to fit either thumbnail size. After block 1752, method 1700 continues to block 1714 to continue processing.

In the case where the current visual object does not meet an upsizing condition, method 1700 continues from block 1752 to block 1754. In block 1754, the system selects a thumbnail size according to assigned probabilities for the case of three or four empty spaces. In one embodiment, the system assigns a 40% probability to the thumbnail size of 1×1, a 40% probability to the thumbnail size of 2×1, a 10% probability to the thumbnail size of 2×2, and a 10% probability to the thumbnail size of 3×2. The system selects a thumbnail size according to the assigned probabilities. After block 1754, method 1700 proceeds to block 1714 to continue processing.

Proceeding to block 1760, where the system determines that the current visual object has a square aspect ratio, the system determines whether the row height of the current row is one. If so, method 1700 proceeds to block 1762. If not, method 1700 continues to block 1768.

In block 1762, where the system has determined that the current row height is one, the system determines whether the current visual object meets an upsizing condition and whether there is sufficient empty space for a 2×2 thumbnail size. If the current visual object meets an upsizing condition and there is enough empty space for a 2×2 thumbnail size, method 1700 continues to block 1764 where the system selects the 2×2 thumbnail size for the current visual object. After block 1764, method 1700 continues to block 1714 to continue processing. If the system determines that the current visual object does not meet an upsizing condition or the current visual object meets an upsizing condition, but there is not enough empty space to fit a 2×2 thumbnail size, method 1700 proceeds from block 1762 to block 1766. In block 1766, the system selects a 1×1 thumbnail size for the current visual object. After block 1766, method 1700 proceeds to block 1714 to continue processing.

Continuing with block 1768, where the system has determined that the row height is two, the system determines whether there is one empty space in the current row. If so, method 1700 continues to block 1770 where the system selects the 1×1 thumbnail size for the current visual object. After block 1770, method 1700 continues to block 1714 to continue processing. If the system determines that there is more than one empty space, method 1700 continues to block 1772 from block 1768.

In block 1772, the system determines whether the current visual object meets an upsizing condition. If so, method 1700 continues to block 1776 where the system selects the 2×2 thumbnail size for the current visual object. If the current visual object does not meet an upsizing condition, method 1700 continues to block 1774 where the system selects a thumbnail size for the current visual object according to assigned probabilities for two, three, or four empty spaces. In one embodiment, the system assigns a 50% probability to the thumbnail size of 1×1 and a 50% probability to a thumbnail size of 2×2. The system selects a thumbnail size using the assigned probabilities. After block 1774, method 1700 proceeds to block 1714 to continue processing.

FIG. 17 illustrates an exemplary method that may be used to generate a mosaic layout as generally described within this disclosure. FIG. 17 favors smaller sized thumbnails unless the visual object being processed meets one or more particular upsizing conditions. It should be appreciated that the various probabilities used in describing FIG. 17 are for purposes of illustration only and, as such, are not intended to be limiting. The probabilities may be adjusted up or down.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one arrangement," "an arrangement" or similar language means that a particular feature, structure, or characteristic described in connection with the embodiment or arrangement is included in at least one embodiment or arrangement described within this disclosure. Thus, appearances of the phrases "in one embodiment," "in an embodiment," "in one arrangement," "in an arrangement" and similar language throughout this disclosure may, but do not necessarily, all refer to the same embodiment or arrangement.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, specify state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

A method of presenting thumbnails of visual objects may include determining, using a processor, aspect ratios for a plurality of visual objects, associating, using the processor, each of the plurality of visual objects with a thumbnail size selected from a plurality of predetermined thumbnail sizes based upon the aspect ratio of the visual object, and determining, using the processor, whether a visual feature is detected within the plurality of visual objects. The method may include generating, using the processor, a layout for displaying thumbnails of the plurality of visual objects based on chronological order of the visual objects, detection of the visual feature, and the thumbnail sizes associated with the visual objects. Using a screen and the processor, the thumbnails may be displayed according to the layout.

Generating the layout may include selecting a thumbnail size for a selected visual object for inclusion in the layout from a plurality of the thumbnail sizes associated with the selected visual object according to metadata of the selected visual object.

In one aspect, an area of a selected visual object that includes the detected visual feature is visible within the thumbnail for the selected visual object displayed using the layout.

Generating the layout may include selecting a thumbnail size for a selected visual object for inclusion in the layout from a plurality of the thumbnail sizes associated with the selected visual object according to the detected visual feature.

Generating the layout may include generating a motion thumbnail from a plurality of visual objects.

The layout may include a plurality of rows organized into a plurality of sequences with each adjacent pair of sequences being different.

Generating the layout may also include determining whether a last sequence of the layout has an allowable sequence placement and re-creating the last sequence in response to determining that the last sequence does not have an allowable sequence placement.

An apparatus for presenting thumbnails of visual objects includes a screen and a processor coupled to the screen. The processor may be configured to determine aspect ratios for a plurality of visual objects, associate each of the plurality of visual objects with a thumbnail size selected from a plurality of predetermined thumbnail sizes based upon the aspect ratio of the visual object, and determine whether a visual feature is detected within the plurality of visual objects. The processor may further be configured to generate a layout for displaying thumbnails of the plurality of visual objects according to chronological order of the visual objects, detection of the visual feature, and the thumbnail sizes associated with the visual objects. The processor may, using the screen, display the thumbnails according to the layout.

In one aspect, the processor is configured to generate a layout through selection of a thumbnail size for a selected visual object for inclusion in the layout from a plurality of the thumbnail sizes associated with the selected visual object according to metadata of the selected visual object.

In another aspect, an area of a selected visual object that includes the detected feature is visible within the thumbnail for the selected visual object displayed using the layout.

In another aspect, the processor is configured to generate a layout through selection of a thumbnail size for a selected visual object for inclusion in the layout from a plurality of the thumbnail sizes associated with the selected visual object according to the detected visual feature.

In still another aspect, layout generation may include the processor being configured to generate a motion thumbnail from a plurality of visual objects.

The layout may include a plurality of rows organized into a plurality of sequences with each adjacent pair of sequences being different.

In yet another aspect, layout generation may include the processor being configured to determine whether a last sequence of the layout has an allowable sequence placement and re-create the last sequence in response to determining that the last sequence does not have an allowable sequence placement.

A computer program product includes a computer readable storage medium having program code stored thereon for presenting thumbnails of visual objects. The program code is executable by a processor to perform operations. The operations may include determining, using the processor, aspect ratios for a plurality of visual objects, associating, using the processor, each of the plurality of visual objects with a thumbnail size selected from a plurality of predetermined thumbnail sizes based upon the aspect ratio of the visual object, and determining, using the processor, whether a visual feature is detected within the plurality of visual objects. The operations may include generating, using the processor, a layout for displaying thumbnails of the plurality of visual objects based on chronological order of the visual objects, detection of the visual feature, and the thumbnail sizes associated with the visual objects. The operations may include displaying, using a screen and the processor, the thumbnails according to the layout.

Generating the layout includes selecting a thumbnail size for a selected visual object for inclusion in the layout from a plurality of the thumbnail sizes associated with the selected visual object according to metadata of the selected visual object.

In one aspect, an area of a selected visual object that includes the detected feature is visible within the thumbnail for the selected visual object displayed using the layout.

Generating the layout may include selecting a thumbnail size for a selected visual object for inclusion in the layout from a plurality of the thumbnail sizes associated with the selected visual object according to the detected visual feature.

Generating the layout may include generating a motion thumbnail from a plurality of visual objects.

In another aspect, the layout includes a plurality of rows organized into a plurality of sequences with each adjacent pair of sequences being different.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of presenting thumbnails of visual objects, the method comprising:
   determining, using a processor, aspect ratios for a plurality of visual objects;
   associating, using the processor, each visual object of the plurality of visual objects with a subset of thumbnail sizes selected from a plurality of predetermined thumbnail sizes based upon aspect ratio of each visual object;
   performing image processing, using the processor, by detecting visual features within the plurality of visual objects and orientations of the visual features;
   generating, using the processor, a layout for displaying thumbnails of the plurality of visual objects based on chronological order of the plurality of visual objects, the subsets of thumbnail sizes associated with the plurality of visual objects, and the visual features and orientations of the visual features, wherein the generating includes selecting a thumbnail size for a first selected visual object for inclusion in the layout from the subset of thumbnail sizes associated with the first selected visual object based on orientation of a first visual feature within the first selected visual object and, responsive to determining that a metadata attribute of the first selected visual object from a social media Website exceeds a threshold, selecting a larger thumbnail size for the first selected visual object from the subset of thumbnail sizes associated with the first selected visual object;
   generating, using the processor, the thumbnails for the layout; and
   displaying, using a screen and the processor, the thumbnails according to the layout.

2. The method of claim 1, wherein the metadata attribute is a sentiment indication.

3. The method of claim 1, wherein the metadata attribute is a user rating.

4. The method of claim 1,
   wherein the selecting the thumbnail size is further performed based on determining that the first visual feature extends substantially across an entirety of a height or an entirety of a width of the first selected visual object.

5. The method of claim 1, wherein the metadata attribute is at least one of a number of views or a number of shares.

6. The method of claim 1, wherein:
   the layout comprises a plurality of rows organized into a plurality of sequences with each adjacent pair of sequences being different, wherein each sequence includes at least two rows of the plurality of rows.

7. The method of claim 6, wherein the generating the layout comprises:
   re-creating a last sequence in response to determining that the last sequence does not have an allowable sequence placement.

8. An apparatus for presenting thumbnails of visual objects, comprising:
   a processor configured to initiate operations including:
   determining aspect ratios for a plurality of visual objects;
   associating each visual object of the plurality of visual objects with a subset of thumbnail sizes selected from a plurality of predetermined thumbnail sizes based upon aspect ratio of each visual object;
   performing image processing by detecting visual features within the plurality of visual objects and orientations of the visual features;
   generating a layout for displaying thumbnails of the plurality of visual objects according to chronological order of the plurality of visual objects, the subsets of thumbnail sizes associated with the plurality of visual objects, and the visual features and orientations of the visual features, wherein the generating includes selecting a thumbnail size for a first selected visual object for inclusion in the layout from the subset of thumbnail sizes associated with the first selected visual object based on orientation of a first visual feature within the first selected visual object and, responsive to determining that a metadata attribute of the first selected visual object from a social media Website exceeds a threshold, selecting a larger thumbnail size for the first selected visual object from the subset of thumbnail sizes associated with the first selected visual object; and
   generating the thumbnails for the layout; and
   a screen coupled to the processor and configured to display the thumbnails according to the layout.

9. The apparatus of claim 8, wherein the metadata attribute is a sentiment indication.

10. The apparatus of claim 8, wherein the metadata attribute is a user rating.

11. The apparatus of claim 8, wherein the selecting the thumbnail size is further performed based on determining that the first visual feature extends substantially across an entirety of a height or an entirety of a width of the first selected visual object.

12. The apparatus of claim 8, wherein the metadata attribute is at least one of a number of views or a number of shares.

13. The apparatus of claim 8, wherein:
   the layout comprises a plurality of rows organized into a plurality of sequences with each adjacent pair of sequences being different, wherein each sequence includes at least two rows of the plurality of rows.

14. The apparatus of claim 13, wherein the generating the layout comprises:
   re-creating a last sequence in response to determining that the last sequence does not have an allowable sequence placement.

15. A computer program product comprising a computer readable storage medium having program code stored thereon for presenting thumbnails of visual objects, the program code executable by a processor to perform operations comprising:
   determining, using the processor, aspect ratios for a plurality of visual objects;
   associating, using the processor, each visual object of the plurality of visual objects with a subset of thumbnail sizes selected from a plurality of predetermined thumbnail sizes based upon aspect ratio of each visual object;
   performing image processing, using the processor, by detecting visual features within the plurality of visual objects and orientations of the visual features;
   generating, using the processor, a layout for displaying thumbnails of the plurality of visual objects based on chronological order of the plurality of visual objects, the subsets of thumbnail sizes associated with the plurality of visual objects, and the visual features and orientations of the visual features, wherein the generating includes selecting a thumbnail size for a first selected visual object for inclusion in the layout from the subset of thumbnail sizes associated with the first selected visual object based on orientation of a first visual feature within the first selected visual object and, responsive to determining that a metadata attribute of the first selected visual object from a social media Website exceeds a threshold, selecting a larger thumbnail size for the first selected visual object from the subset of thumbnail sizes associated with the first selected visual object;

generating the thumbnails for the layout; and displaying, using a screen and the processor, the thumbnails according to the layout.

16. The computer program product of claim 15, wherein the metadata attribute is a sentiment indication.

17. The computer program product of claim 15, wherein the metadata attribute is a user rating.

18. The computer program product of claim 15, wherein the selecting the thumbnail size is further performed based on determining that the first visual feature extends substantially across an entirety of a height or an entirety of a width of the first selected visual object.

19. The computer program product of claim 15, wherein the metadata attribute is at least one of a number of views or a number of shares.

20. The computer program product of claim 15, wherein:
the layout comprises a plurality of rows organized into a plurality of sequences with each adjacent pair of sequences being different, wherein each sequence includes at least two rows of the plurality of rows.

21. An apparatus for presenting thumbnails of visual objects, comprising:
a processor configured to initiate operations including:
determining aspect ratios for a plurality of visual objects;
associating each of the plurality of visual objects with a subset of thumbnail sizes selected from a plurality of predetermined thumbnail sizes based upon aspect ratio of each visual object;
generating, using the processor, a layout for displaying thumbnails of the plurality of visual objects based on chronological order of the plurality of visual objects and the subsets of thumbnail sizes associated with the plurality of visual objects, wherein the generating includes selecting a thumbnail size for a first selected visual object for inclusion in the layout from the subset of thumbnail sizes associated with the first selected visual object and, responsive to determining that a metadata attribute of the first selected visual object from a social media Website exceeds a threshold, selecting a larger thumbnail size for the first selected visual object from the subset of thumbnail sizes associated with the first selected visual object, wherein the metadata attribute includes at least one of sentiment indication, user rating, number of views, or number of shares; and generating the thumbnails for the layout; and a screen coupled to the processor and configured to display the thumbnails according to the layout.

22. The apparatus of claim 21, wherein the processor is configured to initiate operations further comprising:
performing image processing by detecting visual features within the plurality of visual objects and orientations of the visual features;
wherein the generating the layout for displaying thumbnails of the plurality of visual objects is further performed according to the visual features and the selecting a thumbnail size for the first selected visual object is also performed based on orientation of a first visual feature within the first selected visual object.

23. The apparatus of claim 22, wherein the selecting the thumbnail size is further performed based on determining that the first visual feature extends substantially across an entirety of a height or an entirety of a width of the first selected visual object.

24. The apparatus of claim 21, wherein:
the layout comprises a plurality of rows organized into a plurality of sequences with each adjacent pair of sequences being different, wherein each sequence includes at least two rows of the plurality of rows.

25. The apparatus of claim 24, wherein the generating the layout comprises:
re-creating a last sequence in response to determining that the last sequence does not have an allowable sequence placement.

* * * * *